United States Patent [19]

Felder

[11] Patent Number: 4,811,830

[45] Date of Patent: Mar. 14, 1989

[54] SORTING INSTALLATION FOR PIECE GOODS

[75] Inventor: Christian Felder, Dreieichenhain, Fed. Rep. of Germany

[73] Assignee: Gebhardt Fördertechnik GmbH, Sinsheim, Fed. Rep. of Germany

[21] Appl. No.: 489,013

[22] Filed: Apr. 27, 1983

[30] Foreign Application Priority Data

Apr. 28, 1982 [DE] Fed. Rep. of Germany ....... 3215744

[51] Int. Cl.$^4$ ............................................. B65G 37/00
[52] U.S. Cl. ...................................... 198/372; 198/361
[58] Field of Search ............... 198/369, 361, 367, 371, 198/372, 580, 539; 209/702, 703, 942

[56] References Cited

U.S. PATENT DOCUMENTS

| | | | |
|---|---|---|---|
| 1,439,825 | 12/1922 | Kuhn et al. | 209/703 |
| 1,472,679 | 10/1923 | Roddy | 198/361 |
| 2,062,604 | 12/1936 | Paxton | 198/369 |
| 3,533,498 | 10/1970 | Weir | 198/539 |
| 3,592,333 | 7/1971 | Sullivan et al. | 198/361 |
| 4,603,771 | 8/1986 | Felder | 198/367 |

*Primary Examiner*—Joseph E. Valenza
*Attorney, Agent, or Firm*—Barnes & Thornburg

[57] ABSTRACT

A sorting installation for piece goods to be stored in warehouses in which a large number of different types of goods have to be continuously conveyed to their assigned storage place. The goods which arrive in non-sorted condition must be controlled, sorted, registered and further conveyed to their ultimate destination in the warehouse. The sorting installation includes a main conveyor, a sorting station, and a delivery conveyor which are connected with each other by intermediate tracks in such a manner that the intermediate tracks upstream and downstream of the sorting station are constructed as gravity-roller-tracks while at least one distributor constructed as gravity-roller-track and adapted to be inclined in the transporting direction is arranged between the main conveyor and the sorting station.

11 Claims, 2 Drawing Sheets

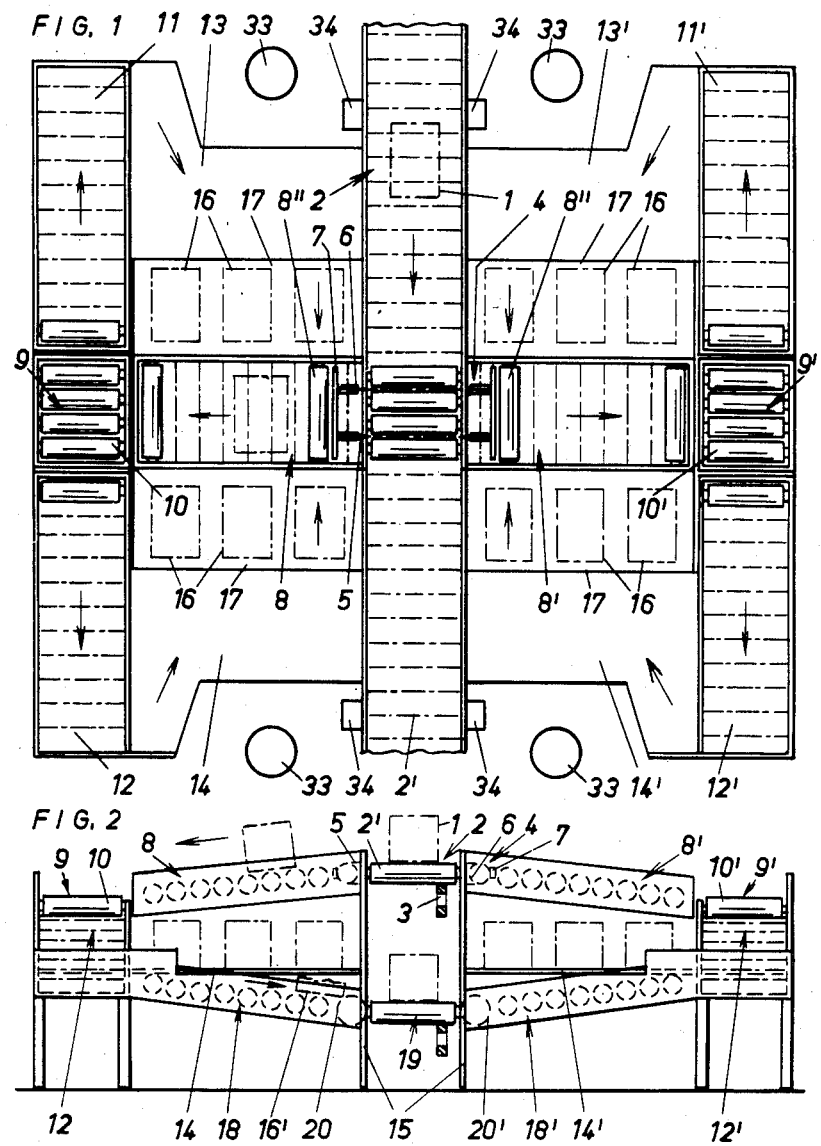

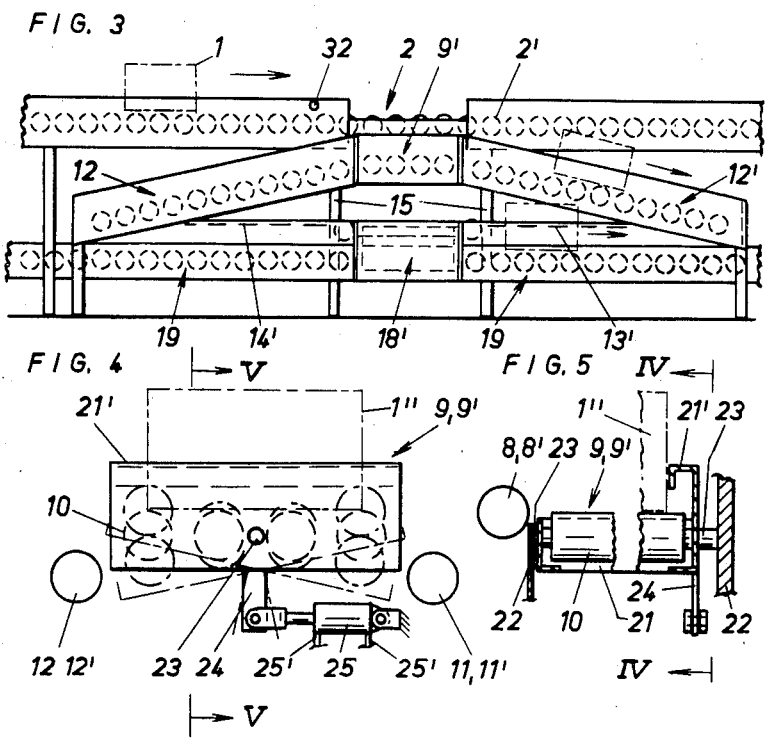
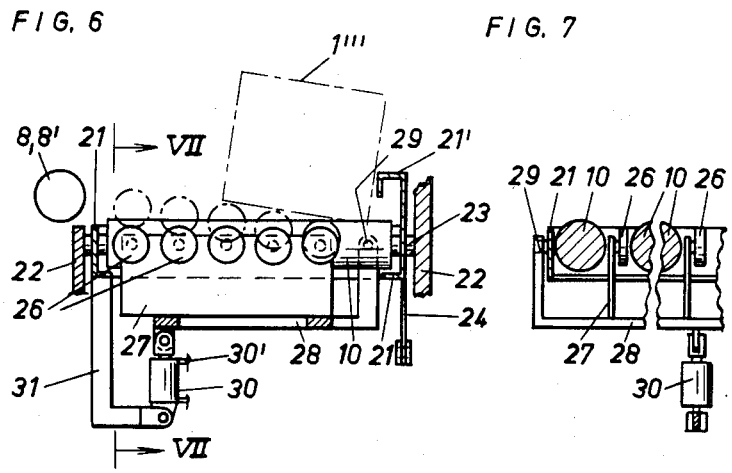

SORTING INSTALLATION FOR PIECE GOODS

The present invention relates to a sorting installation for piece goods with a feeding main conveyor, a sorting station and a delivery conveyor which are connected with each other by intermediate tracks.

In warehouses with a large number of different types of goods, the goods have to be conveyed continuously to their assigned storage place. The goods which arrive in non-sorted condition, must thus be controlled, sorted and then be conveyed on. Since all types on goods must be handled and processed at each sorting station, the connection of each sorting station with each individual storage place is absolutely necessary. Additionally, each piece good or article has to be registered in the central storage device of the computer or the like in order to obtain a control concerning the respective inventory and movement of goods. The operations to be carried out in the sorting installation are therefore very numerous and complex.

It is the object of the present invention to provide a sorting installation which permits by simple means a high sorting output and efficiency.

The underlying problems are solved according to the present invention in that the intermediate tracks upstream and downstream of the sorting station are constructed as gravity-roller-tracks and in that at least one distributor is arranged between the main conveyor and sorting station which is constructed as gravity-roller-track adapted to be inclined in the transporting direction.

The advantages achieved with the present invention reside in particular in that as a result of the construction of the intermediate tracks and of the distributor as gravity roller track, a simple construction exists since no separate drives are necessary therefor which additionally have to be controlled separately. The determination of the busy condition of distributor and sorting station therefore suffices for the control of the entire sorting installation. In particular, an unequivocal and safe further conveyance of the piece goods can be achieved in a simple manner, as a result of which the sorting stations connected downstream are supplied continuously with piece goods to be sorted, as needed. The full utilizaton and load equalization of the sorting stations are thus assured so that the sorting output and efficiency are correspondingly high. Furthermore, piece goods of different type, especially of different sorted sizes can be further conveyed to different destinations, for example, to the individual storage pieces either individually or also in containers. The sorting installation according to the present invention is thus utilizable in a very versatile manner for piece goods of all types.

These and other objects, features and advantages of the present invention will become more apparent from the following description when taken in connection with the accompanying drawing which shows, for purposes of illustration only, one embodiment in accordance with the present invention, and wherein:

FIG. 1 is a plan view of a sorting installation according to the present invention;

FIG. 2 is a front elevational view of the sorting installation of FIG. 1;

FIG. 3 is a side elevational view of the sorting installation of FIG. 1;

FIG. 4 is a somewhat schematic side elevational view of the distributor of a sorting installation in accordance with the present invention, taken along line IV—IV of FIG. 5;

FIG. 5 is a cross-sectional view taken along line V—V of FIG. 4;

FIG. 6 is a cross-sectional view through the distributor of a modified embodiment in accordance with the present invention; and FIG. 7 is a cross-sectional view taken along line VII—VII of FIG. 6.

Referring now to the drawing wherein like reference numerals are used throughout the various views to designate like parts, the sorting installation for piece goods or the like according to FIGS. 1 to 3 includes a main conveyor 2 feeding the workpieces 1, which is constructed as roller-track with rollers 2' driven, for example, by an endless belt 3 (FIG. 2). Within the sorting installation, a cross conveyor generally designated by reference numeral 4 is built into the main conveyor 2, which forms a chain pusher and includes at least two parallel chains 5 supported in the upper section thereof between adjacent rollers 2' underneath the conveyance plane.

The chains 5 are deflected on the outside adjacent the main conveyor 2 by sprocket wheels 6 connected with each other, which are driven by a gear motor (not shown). Two pushers 7 are secured on the chains 5 at equal distances, which are guided over the main conveyor 2 above the conveyance plane thereof, for laterally pushing off a piece good 1 disposed thereon. The gear motor is preferably adapted to be driven in a reversible manner so that a piece good 1 can be pushed off selectively to the one or the other side. In the normal position, the pushers 7 are disposed at equal distances adjacent the main conveyor 2.

Preferably at both sides of the main conveyor 2, auxiliary tracks 8, respectively, 8' (FIGS. 1 and 2) are provided in extension of the cross conveyor 4, which are constructed as gravity-roller-tracks with freely rotatably supported support rollers 8''. The auxiliary tracks 8 and 8' are inclined toward the side in the transporting direction and terminate each in a distributor 9, respectively, 9'. The distributor 9, respectively, 9' includes a group of rollers 10, respectively, 10' freely rotatable supported in a frame perpendicularly to the support rollers 8'' of the auxiliary tracks 8, respectively, 8' in order to further transport a piece good pushed thereon in parallel to the main conveyor 2. Feed tracks 11 and 12, respectively, 11' and 12' which are constructed also as gravity-roller-tracks, adjoin the distributor 9, respectively, 9' at both ends thereof as further intermediate track; the feed tracks 11 and 12, respectively, 11' and 12' are arranged correspondingly inclined and terminate at the height of sorting stations 13 and 14, respectively, 13' and 14' constructed as a platform. The latter extend between the feed track 11, 12, 11' and 12' and the main conveyor 2, respectively, the frame 15 carrying the same. A deposit surface 17 for the piece goods, respectively, containers 16 is arranged downstream of the sorting station 13, 14, 13', 14' and at the same height. A loading track 18, respectively, 18' also constructed as gravity-roller-track which is provided between oppositely disposed deposit surfaces 17, i.e., below the auxiliary track 8, respectively, 8', terminates with corresponding inclination on both sides thereof at a removal or delivery conveyor 19 supported at the frame 15 below the main conveyor 2.

The delivery conveyor 19 includes a driven roller track crossing the sorting station. The last roller of the loading track 18, respectively, 18' ahead of the delivery conveyor 19 is constructed as driven loading roller 20, respectively, 20'. The latter slightly projects above the transporting plane of the loading track 18, respectively, 18' so that a piece good 16' (FIG. 2) rolling on the loadign track butts against the loading roller 20, respectively, 20' and is stopped. Only after turning on the loading roller 20, respectively, 20', the piece good 16 is then pushed onto the delivery conveyor 19 by way of the loading roller 20, respectively, 20'. The drive of the loading roller 20, respectively, 20' takes place by a motor (not illustrated) which may be arranged inside or outside of the loading roller 20, respectively, 20'. The loading roller 20, respectively, 20' is controlled by sensors such as, for example, light barriers or the like which announce the presence of a piece good 16' and monitor the delivery conveyor 19 in order to determine the appropriate point of time for energizing the loading roller 20, respectively, 20'.

According to FIGS. 4 and 5, the rollers 10 of the distributor 9, respectively, 9' are rotatably supported in a frame 21 which is adapted to be tilted toward both sides centrally about a shaft 23 arranged parallel to the longitudinal axis of the rollers 10 and carried by a fixed outer frame 22. The frame 21 terminates at the top below the transporting plane of the rollers 10. Only the outer wall 21', i.e., the wall disposed opposite the auxiliary track 8, respectively, 8' is raised and serves as abutment for the piece good 1" pushed from the auxiliary track 8, respectively, 8' onto the rollers 10 (FIG. 5). A downwardly projecting arm 24 is secured below the shaft 23, with which the piston rod of an actuating cylinder 25 is pivotally connected; the actuating cylinder 25, in turn, is fixedly supported at the outer frame 22. Pressure medium is conducted to and from the actuating cylinder 25 by way of connections 25' in order to move the piston rod from the illustrated center position into one of the two end positions and thus tilt the frame 21.

In the horizontal loading position illustrated in FIG. 4 in full line, the axes of the rollers 10 are disposed approximately parallel to the axes of the support rollers 8" of the auxiliary track 8, 8'. Depending on requirements, the frame 21 is inclined toward the one or the other side in one of the end positions, as indicated in dash and dotted lines, so that the transport plane of the distributor 9, respectively, 9' is disposed approximately in extension of the transporting plane of the feed track 11, 12, 11' or 12' and a piece good 1" disposed thereon rolls off in the direction of the inclination.

In a further embodiment according to FIGS. 6 and 7, a roller group 26 may additionally be provided in the distributor 9, respectively 9' which are rotatably supported at vertical webs 27 between the rollers 10. The webs 27 are mounted on a support frame 28 which is pivotally supported on bolts 29 at the end of the frame 21 opposite the auxiliary track 8, respectively, 8'. An actuating cylinder 30 operable in the upward direction which is pivotally connected at the bottom of the support frame 28, is supported on a support arm 31 of the frame 21. By introducing pressure medium into one of the connections 30', the roller group 26 can be pivoted in the clockwise direction from the normal position disposed below the transporting plane of the rollers 10 into the raised receiving position, indicated in dash and dotted lines, approximately in extension of the transporting plane of the auxiliary track 8, respectively, 8', in which raised position the piece good 1" can be received and can then be placed onto the rollers 10 by lowering.

It can be seen that a piece good 1 fed on the main conveyor 2 turns on the cross conveyor 4 by passing a switching device 32 (FIG. 3), such as a light barrier or the like in such a manner that the piece good is pushed toward the one or the other side onto one of the auxiliary tracks 8 and 8' depending on the pre-programmed release, rolls off on the same in the downward direction and comes to rest on the distributor 9, respectively, 9'. If the roller group 26 is provided in the latter, then the roller group 26 has been raised prior thereto in order to be lowered again after receiving the piece good 1" or in order to be lowered again only shortly before the further conveyance. As soon as the receiving place of the downstream-connected sorting station 13, 14, 13', 14' is free, the distributor 9, respectively, 9' is inclined in the direction of the coordinated feed track 11, 12, 11' or 12' and the piece good rolls off on the same in the downward direction as shown on the feed track 12' in FIG. 3.

At the sorting station 13, 14, 13' or 14', the piece good is controlled by a person 33 and is coordinated to a storage location. The data concerning the same are fed into the input 34 of a storage or memory device of a computer or the like. Thereupon, the piece good is placed on the deposit surface 17 or into a container 16 standing thereat, coordinated to the assigned destination. By pushing off the piece good or container onto the loading track 18, respectively, 18', the piece good 16' is able to move on the same by gravity until abutting against the loading roller 20, respectively, 20'. If sufficient space, i.e., a sufficiently long gap exists on the delivery conveyor 19 between successive piece goods, then the loading roller 20, respectively, 20' is turned on and the piece good, respectively, the container 16' is pushed onto the delivery conveyor 19 in order to be able to be conveyed on the same to the predetermined destination.

Of course, several distributors 9 and 9' may also be provided between the main conveyor 2 and the sorting station 13, 14, 13' and/or 14' in order to obtain a further bifurcation with corresponding sorting stations connected downstream in larger numbers. Similarly, an auxiliary track 8, respectively, 8' and/or feed track 11, 12, 11' or 12' may be connected only to one side at the cross conveyor 4 and/or at the distributor 9, respectively, 9' in order to adapt the sorting installation to the existing space conditions and/or sorting output.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A sorting installation for piece goods comprising a feeding main conveyor means, at least two sorting stations and a delivery conveyor means which are connected with each other by intermediate track means to enable movement of said piece goods from said main conveyor means all the way to any one of the at least two sorting stations on a first portion of as well as one of two second portions of said intermediate track means, which second portion extends substantially parallel to the main conveyor means, and then from said sorting stations onto a common third portion of the intermediate track means to the delivery conveyor means, all portions of the intermediate track means being constructed as gravity-roller-tracks, and at least one distributor means in said intermediate track means between said first portion and the two second portions which is constructed as gravity-roller-track and operable to be inclined in the transporting direction toward either of the at least two sorting stations to direct goods form the first portion of the intermediate track means to one of the at least two second portions of the intermediate track which lead to one of the at least two sorting stations and is arranged between the main conveyor means and the sorting station.

2. A sorting installation according to claim 1, wherein for purposes of removal from the main conveyor means a cross conveyor means operable to be driven and constructed as chain pusher means is provided, and a loading roller means operable to be driven is provided for loading the workpiece onto the delivery conveyor means.

3. A sorting installation according to claim 2, wherein the first portion of the intermediate track means arranged downstream of the cross conveyor means includes an auxiliary track means terminating in one of the distributor means with a transporting directoin disposed substantially perpendicular to the auxiliary track means, said distributor means being operable to tilt about an axis arranged substantially parallely to the longitudinal axis of the auxiliary track means toward one of the second portions of the intermediate track means provided at the outlet of the distributor means and serving as feed track leadin to a respective sorting station.

4. A sorting installation according to claim 3, wherein the second portions of the intermediate track means comprises feed track means provided at each of the ends of the distributor means, and the distributor means is operable to be tilted out of a horizontal loading position toward the one or the other feed track means into a discharge position.

5. A sorting installation according to claim 4, wherein a roller group is provided in the distributor means operable to be tiled about an axis substantially parallel to the transporting direction of the distributor means, said roller group being arranged between rollers of the distributor means so as to be operable to be raised and lowered and being tiltable from its normal position below the transporting plane of the distributor means into a plane approximately parallel to the transporting plane of the first portion of the intermediate track means above the transporting plane of the distributor means.

6. A sorting installation according to claim 5, wherein the plural sorting stations include a platform arranged between the second and third portions of the intermediate track means, said platform being constructed approximately at the height of the third portion of the intermediate track means.

7. A sorting installation according to claim 1, wherein a roller group is provided in the distributor means, means being associated with said roller group operable for tilting the roller group about an axis substantially parallel to the transporting direction of the distributor means, said roller group being arranged between rollers of the distributor means so as to be operable to be raised and lowered and being tiltable from its normal position below the transporting plane of the distributor means into a plane approximately parallel to the transporting plane of an auxiliary track means included in the intermediate track means above the transporting plane of the distributor means, stop means associated with said distributor means for positioning piece goods relative thereto.

8. A sorting installation according to claim 1, wherein the plural sorting stations include a platform arranged between the second and third portions of the intermediate track means, said platform being constructed approximately at the height of the third portion of the intermediate track means.

9. A sorting installation according to claim 8, wherein for purposes of removal from the main conveyor means a cross conveyor means operable to be driven and constructed as chain pusher means is provided, and a loading roller means operable to be driven is provided at the downstream end of the loading track for loading the workpiece onto the delivery conveyor means.

10. A sorting installation according to claim 9, wherein the first portion of the intermediate track means arranged downstream of the cross conveyor means includes an auxiliary track means terminating in one of the distributor means with a transporting direction disposed substantially perpendicular to the auxiliary track means, said distributor means being operable to tilt about an axis arranged substantially parallely to the longitudinal axis of the auxiliary track means toward a second portion of the intermediate track means provided at the outlet of the distributor means and serving as feed track leading to the sorting station.

11. A sorting installation according to claim 3, wherein the second portions of the intermediate track means comprise feed track means provided at each of the ends of the distributor means, and the distributor means is operable to be tilted out of a horizontal loading position toward the one or the other feed track means into a discharge position.

* * * * *